United States Patent [19]

Reynolds

[11] 4,110,396

[45] Aug. 29, 1978

[54] CURVED TUBULAR ARTICLES AND METHOD

[75] Inventor: Linda M. Reynolds, Goleta, Calif.

[73] Assignee: The Gates Rubber Company, Denver, Colo.

[21] Appl. No.: 470,249

[22] Filed: May 15, 1974

[51] Int. Cl.² .............................................. B29C 25/00
[52] U.S. Cl. .................................. 264/236; 264/230; 264/320; 264/339
[58] Field of Search ............... 264/322, 230, 236, 339, 264/320

[56] References Cited

U.S. PATENT DOCUMENTS

| 1,880,053 | 9/1932 | Schur | 264/339 X |
| 2,964,796 | 12/1960 | Press | 264/339 X |
| 3,559,766 | 2/1971 | Heslop | 185/39 |
| 3,837,957 | 9/1974 | Mesnel | 264/236 X |

Primary Examiner—Thomas P. Pavelko
Attorney, Agent, or Firm—Curtis H. Castleman, Jr.; Raymond Fink; H. W. Oberg, Jr.

[57] ABSTRACT

A method for the production of curved tubular elastomeric articles such as hose is described which uses a heat recoverable mandrel which when heated above its transition temperature range undergoes a transformation and reverts to a preselected curvilinear shape. A further temperature rise then vulcanizes the elastomeric article formed on the mandrel. The resultant curved tubular article has improved resistance to flex fatigue and obviates the problem of hot tear.

17 Claims, 2 Drawing Figures

(PART I)

1. MEMORY HEAT TREAT MANDREL @ 900° F.
2. STRAIGHTEN AND LOAD UNCURED HOSE.
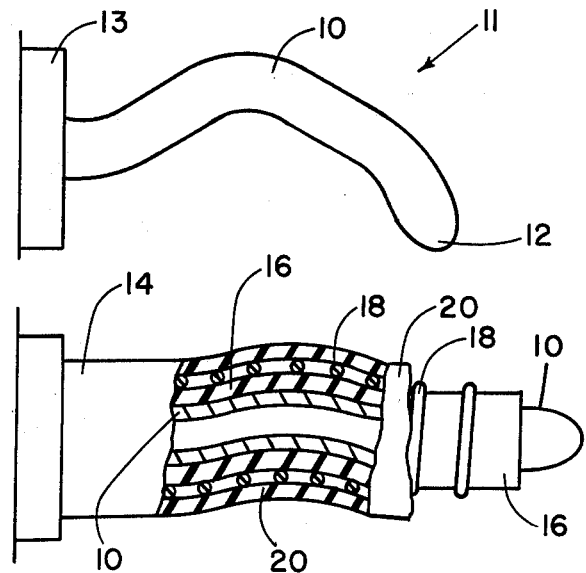
3. HEAT TO TRANSITION TEMPERATURE RANGE BELOW VULCANIZING TEMPERATURE.
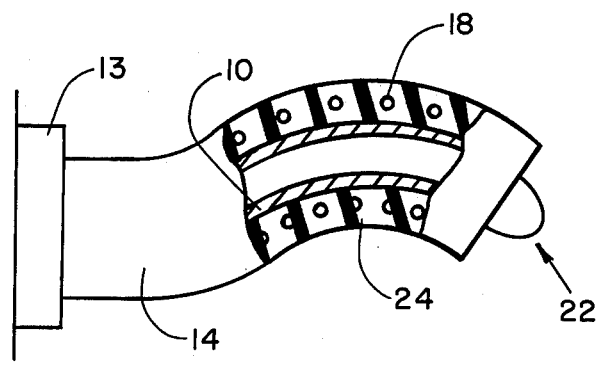
4. FURTHER ELEVATE TEMPERATURE AND VULCANIZE HOSE.
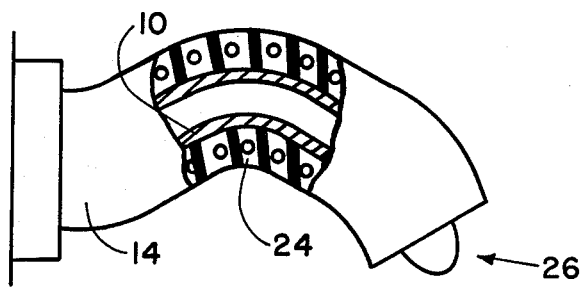
FIG. I
(PART I)

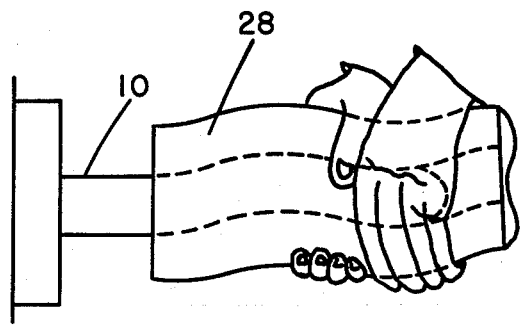
5. ALLOW TO COOL BELOW TRANSITION TEMPERATURE RANGE, STRAIGHTEN AND REMOVE.
6. FOR SAME SHAPED HOSE LOAD AND REPEAT STEPS 3-5; FOR DIFFERENT SHAPED HOSE BEGIN WITH STEP 1.
FIG. I
(PART 2)
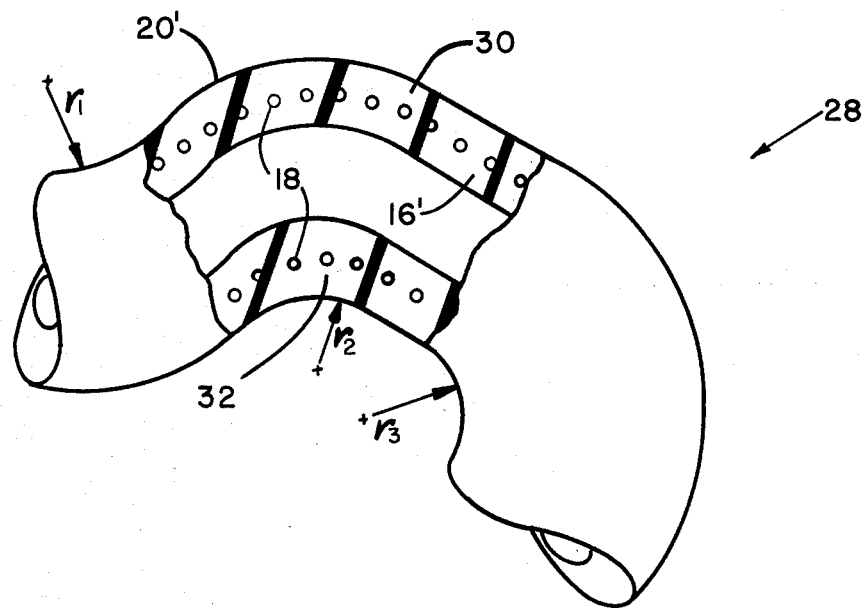
FIG. 2

CURVED TUBULAR ARTICLES AND METHOD

BACKGROUND OF THE INVENTION

This invention relates to the production of tubular elastomeric articles which are permanently bent or curved in a desired configuration.

An example of a curved tubular elastomeric article to which this invention relates is an automotive radiator coolant hose. Many of these hoses take on very complex configurations due to multiple bends of varying degrees of curvature and planar attitudes. The customary method of producing this type of hose is to extrude a tube, apply reinforcement to the tube and extrude a cover over the reinforcement. The resultant uncured continuous length of hose is cut to size and pushed onto a cast aluminum mandrel which has the shape of the desired finished hose configuration. A considerable quantity of lubricant is normally employed to facilitate loading the hose onto the mandrel. The loaded mandrel is then placed in a vulcanizer, cured, and the finished hose removed from the mandrel.

Particularly with the more complex hose configurations, loading of the hose onto the rigid mandrel in its uncured state and unloading the hose from the rigid mandrel after cure often introduces stress concentrations at the bends in the hose. A particular problem which may occur upon unloading of the hose from the mandrel after exit from the vulcanizer is known as "hot tear," in which the interior wall of the article actually tears or rips apart or develops holes resulting from abrasive forces. This problem may occur when the operator attempts to remove the hose from a mandrel having sharp bends while the article is still hot.

SUMMARY OF THE INVENTION

It is a primary object of the subject invention to overcome the drawbacks of the prior art as aforementioned, and to produce a curved tubular elastomeric article having reduced internal stress at the curved sections, by a simplified process which greatly facilitates the loading and unloading of the article in a safe manner.

Briefly described, the method for producing curved tubular elastomeric articles according to the invention comprises a) loading the tubular article in its uncured state on to a heat recoverable mandrel which has been memory heat treated at a temperature well above the vulcanizing temperature of the article at a preselected curvilinear configuration; b) heating the loaded mandrel to a temperature above the softening point of the elastomer and up through the transition temperature range of the mandrel to cause the mandrel to return substantially to its preselected curved shape; c) further heating the loaded mandrel and vulcanizing the article; and preferably d) cooling the loaded mandrel to below its transition temperature range; e) plastically deforming the loaded mandrel to a desired configuration of lesser curvature than the preselected curvilinear configuration; and f) unloading the finished curved tubular elastomeric article.

The curved tubular elastomeric article produced by the method may comprise an inner tubular member whose inner surface is free from defects normally caused by "hot tearing", a cover surrounding the inner tube and preferably a reinforcement interposed between and bonded to each of the tube and cover. The article is characterized by minimized internal stress at the curved portions of the tubular article, attributable to its method of production.

BRIEF DESCRIPTION OF THE DRAWINGS

Description of certain preferred embodiments of the invention will be made with reference to the accompanying drawings, in which:

FIG. 1 depicts steps of the process in block diagrammatic form, with accompanying illustration of the chronological step by step configuration of the mandrel and tubular article through the course of the process; and FIG. 2 is a view in partial section and cutaway of a curved hose fragment made in accordance with the method of the invention.

PREFERRED EMBODIMENTS OF THE INVENTION

Central to the invention is the use of a mandrel having a "mechanical memory." 55-Nitinol, an alloy developed at the U.S. Naval Ordnance Laboratory exhibits this mechanical memory property. This material, which consists of about 50 to 57 weight percent nickel and the balance titanium has the capability to recover its orginal shape or configuration after mechanical distortion, by simply heating the material above the so-called "martensitic" transition temperature range. The transitional temperature range over which 55-Nitinol will revert to its memory shape may be varied for instance by addition of excess nickel or cobalt, which lowers the transition temperature range, or by increasing the percentage of titanium, which raises the transition temperature range. As is well known, recovery will occur over a temperature range spanning from cryogenic temperatures up to about 300° F. For a more complete discussion of these heat recoverable alloys, reference is made to the article of Buehler and Wang, Ocean Engineering, Vol. 1, pp. 105–120, Pergamon Press, 1968. A typical application of this alloy as well as other "heat recoverable" materials is given in U.S. Pat. No. 3,559,766 issued to Heslop.

As an illustrative embodiment of the invention, in FIG. 1 the initial step of the process involves forming a heat recoverable mandrel having the desired preselected curved configuration 11. The mandrel may be of any basic form such as a rod or a tube 10 having a tapered head portion 12, all made of a heat recoverable material such as nickel-titanium alloy, 55-Nitinol. The mandrel is clamped into a fixture to hold it in the desired shape and heated up to its "memory heat treat" temperature (for 55-Nitinol about 900° F), cooled and removed from the fixture. The memory heat treated mandrel may now be affixed to a suitable support such as a frame (not shown) to facilitate loading and unloading of a tubular elastomeric article.

Once the mandrel has cooled below its transition temperature range it may be deformed plastically under stress if the strain associated with the deformation is limited to about 8 percent. 100 percent or near full recovery will be possible when heat is later applied to raise the temperature above the transition temperature range. Normally it is preferred to substantially straighten the mandrel to facilitate loading of the uncured hose 14, although a full straightening may not be desirable if such deformation would exceed the strain limit of the alloy. In this example, the uncured hose 14 consists of an inner tube 16 extruded from a suitable stock, a reinforcement 18 entrained about the tube, and a cover 20 extruded or otherwise formed over the reinforced tube.

Various types of elastomeric materials may be utilized in compounding the tube and/or cover, including but not limited to natural and synthetic rubbers, exemplified by styrene-butadiene rubber, neoprene, butyl rubber, ethylene-propylene-diene terpolymers, urethanes, and the like. As is conventionally understood, the term "elastomeric" includes materials which have a certain degree of elasticity, resilience, or rebound but also have different degrees of plastic behavior.

Conventional forms of reinforcement may be employed such as textile reinforcement in the form of braid, spiral or knit configuration employing such materials as cotton, rayon, Kevlar (trademark of the duPont Company), and polyester. For certain applications it may in fact not be necessary to use any reinforcement whatsoever, and the invention is meant to cover this alternative.

In the next step of the process, the mandrel carrying the uncured hose length is heated from its ambient or room temperature state up to the transition temperature range of the mandrel. This transition temperature range will be selected in a predetermined manner, as aforementioned, with regard to the particular vulcanizing temperature of the article, but will preferably lie somewhere in the range from about 125° F. up to the vulcanizing temperature of the elastomeric article, more preferably lie in the range from about 200° F. to about 300° F., and most preferably lie in the range from about 250° F. to about 280° F. The actual transition temperature differential through which the article will begin and conclude, respectively, its reversion to memory shape may be about 40° F. or 50° F. for 55-Nitinol. For instance, according to the method so far described, a nickel-titanium alloy mandrel having a selected transition temperature range of from 230° F. to 280° F. will be memory heat treated at about 900° F., cooled to below 230° F., straightened and the uncured hose loaded thereon, and the thus loaded mandrel heated up to the transition temperature range beginning at 230° F.

Since the lower value of the transition temperature range is chosen above the softening point of the elastomer, the uncured elastomer has been softened and is in a state of plasticity as the mandrel begins to revert to its memory state, permitting flow under stress.

As shown in the third step of the method, as the applied heat raises the temperature into the transition temperature range, the mandrel begins to revert to its memory shape, producing an intermediate curved configuration 22. During this transition state is it important that the temperature has been elevated sufficiently to cause the elastomer to be in a flowable or plastic state. This is illustrated by the continuous phase 24 in which the cover has undergone plastic flow and is becoming integral with the inner tube.

The temperature is then further elevated above the transition temperature range to the vulcanizing temperature of the hose. Typical vulcanizing or curing temperatures for most elastomers lie in the range from about 300° to about 370° F., as is well known. Curing time will be dependent upon the curing temperature and pressure, although generally in the range from about 5 to about 45 minutes. Having thus passed through the transition temperature range, the mandrel 10 has "remembered" its memory heat treat form 11 and has undergone substantially full recovery (including 100 percent recovery) as shown at 26. Inasmuch as the curing temperature is intermediate the transition temperature range and the memory heat treat temperature, the mandrel will maintain its preselected curvature thoughout the vulcanizing cycle.

The heating steps denoted as steps 3 and 4 may advantageously be done in a continuous manner in a single vulcanizing apparatus with heat and pressure provided in desired manner. Open steam curing is one such curing technique, utilizing pressures in the range from about 140 to about 170 psi.

The next step is to remove the curved mandrel and hose shown at 26 from the vulcanizer and cool to below the transition temperature range of the nickel-titanium alloy. Cooling may be accomplished in any satisfactory manner such as by air cooling, liquid quenching, etc. When the temperature has dropped below the lower limit of the temperature range, in this example 230° F., the mandrel is then in its highly ductile from associated with the martensitic shear or diffusionless transformation of the alloy and may then be straightened or otherwise deformed sufficiently to ease removal of the finished hose 28 from the plastically deformed mandrel 10, as shown. To reduce the time involved in the cooling step, it is preferred that the snap back or transition temperature range is below and in close proximity to the vulcanizing temperature of the elastomeric article (e.g. the lower limit of the range less than about 50° F. below the vulcanizing temperature).

The finished hose is shown in FIG. 2 having a unitary body section composed of an inner tube 16', an integral cover 20' and embedded in the body section reinforcement member 18. The hose is defined by three bend portions having radii $r_1$, $r_2$, and $r_3$, respectively. The bends formed by each of these radii are not necessarily in the same plane, as is common in complex curved hose configurations.

To make additional replicas of the hose configuration shown in FIG. 2, it is merely necessary to reload and repeat steps 3 through 5 of the process shown in FIG. 1. If a different configuration is desired, the same mandrel may be employed by repeating step 1 using a different fixture of desired configuration. Then as before, steps 2 through 5 are successively repeated.

As previously stated, the heat recoverable nickel-titanium alloy has a strain limit of about 8 percent to permit recovery to essentially 100 percent of its initial strain. In many curved hose configurations the curvature is not so severe that a strain of greater than 8 percent would be required in straightening the mandrel. Furthermore, as aforementioned, the mandrel need not be fully straightened to facilitate loading of the hose and in this manner one can stay within the 8% strain limit. It is a further feature of this invention that the original fixture shape used in step 1 of the process can contain bends which overcompensate for the desired end curvature, i.e. the radii at each of the cuved portions are less than the radii desired in the final hose configuration. In this latter manner, in the second step of the process the deformation of the ductile alloy may be accomplished and also employ strains exceeding the generally recognized strain limit of 8 percent (for 100 percent recovery). The amount of strain exceeding 8 percent is so chosen that upon effecting steps 3 and 4 of the method, the mandrel will "snap back" only a predetermined percentage of the original shape produced by the memory heat treatment and thus produce an end configuration having the final desired bends. It is well known in the art, for instance, that strain levels of 14 percent or greater can be accommodated and still produce bend recovery of greater than 90 percent. Thus, this feature can be utilized to produce the hose configurations having extremely complex bends which would normally require during the process exceeding of the 100 percent recovery capability associated with the 8 percent strain limit.

It is also possible to substantially reduce if not eliminate altogether the need for lubricating the mandrel during loading and unloading of the tubular article. This attribute is of course enabled by the fact that loading and unloading is done on a straight or nearly straight mandrel, as opposed to conventional methods. A very important additional advantage results from unloading the cured article from an essentially straight or gently curved mandrel, and this pertains to the aforementioned problem of "hot tear" obviated by the invention. In a conventional method when the hose is removed from the curved mandrel just after removal from the vulcanizer, the hose article is still quite hot and well above ambient temperatures. As the operator removes the hose from the mandrel the hot inner tubular surface of the hose will often tear or rip when encountering the sharply bent portions of the mandrel.

An additional and quite significant advantage of the completed hose construction of the invention is that the curved portions in particular of the hose are more resistant to flex fatigue and particularly resistant to ozone and weathering by virtue of the low state of stress (as compared with conventional curved hose) existent in the wall of the hose at the bend portions, for instance at 30, 32 in FIG. 2. In the conventional process the uncured hose is loaded on the curve mandrel in a cold condition, thus putting the outer hose wall 30 in tension and inner wall 32 in compression. This problem of undue stress continues through the entire process and results in a latent defect in the finished hose. In contrast, there is considerably less stress in hose wall portions 30 and 32 in the hose made according to the method of the subject invention by virtue of the fact that the elastomeric article is shaped when in a state of relatively greater plasticity and thus there is little stres accompanying the curve producing phenomenon initiated by the return of the mandrel to its memory heat treat form.

The above-described preferred embodiments of this invention are meant to illustrate the invention and not to limit it in any way. A variety of variations and modifications will become apparent to those skilled in the art upon a reading of this specification.

What is claimed is:

1. A method for producing curved tubular elastomeric articles utilizing a heat recoverable mandrel which has been memory heat treated at a temperature well above the vulcanizing temperature of the elastomeric article and at a preselected curvilinear configuration, comprising sequentially the steps of:
   deforming the mandrel from its preselected curvilinear configuration;
   loading the tubular article in at least a partially uncured state on to the mandrel to form a loaded mandrel, said mandrel having a transition temperature range whose lower value is above the softening point of the elastomeric article;
   heating the loaded mandrel up through the transition temperature range of the mandrel which is below the vulcanizing temperature, whereby the mandrel takes on a configuration substantially that of said preselected curvilinear configuration during which said elastomeric article is in an uncured, softened state; and
   vulcanizing the elastomeric article.

2. The method of claim 1 wherein the mandrel is made of a metal alloy characterized by a martensitic transition temperature range below which the metal alloy mandrel may be deformed plastically under stress.

3. The method of claim 2 wherein the alloy consists of about 50 to about 57 weight percent nickel with the balance titanium.

4. The method of claim 1 wherein the prior to said deforming step the mandrel in a basic form is clamped into a fixture to hold it in its preselected curvilinear configuration and then heated up to its memory heat treat temperture, cooled and removed from the fixture.

5. The method of claim 1 wherein the transition temperature range lies within the range from about 125° F. up to the vulcanizing temperature of the elastomeric article.

6. The method of claim 1 wherein said heating and vulcanizing steps are carried out in a continous manner in a common vulcanizing apparatus provided with heat and pressure means.

7. The method of claim 1 wherein the transition temperature range is in close proximity to the vulcanizing temperature of the elastomeric article.

8. The method of claim 1 wherein the mandrel is generally rigid and the curved tubular article is a hose including an inner tube, an outer cover, and a reinforcement interposed between said inner tube and cover.

9. A method for producing curved hose utilizing a heat recoverable metal alloy mandrel which has been memory heat treated at a temperature well above the vulcanizing temperature of the hose and at a preselected curvilinear configuration, comprising sequentially the steps of:
   deforming the mandrel from its preselected curvilinear configuration to a shape having lesser curvature than the preselected curvilinear configuration;
   loading the hose in at least a partially uncured state on to the mandrel to form a loaded mandrel, said mandrel having a transition temperature range which is below the vulcanizing temperature of the hose article, and above the softening temperature of the rubber;
   heating the loaded mandrel up through its transition temperature range whereby the rubber is rendered flowable and in a plastic state, whereby the mandrel takes on a configuration substantially that of said preselected curvilinear configuration;
   vulcanizing the elastomeric article;
   cooling the loaded mandrel to below its transition temperature range;
   plastically deforming the loaded mandrel to a desired configuration of lesser curvature than the preselected curvilinear configuration; and
   unloading the curved hose article.

10. A method for producing curved tubular elastomeric articles utilizing a heat recoverable mandrel which has been memory heat treated at a temperature well above the vulcanizing temperature of the elastomeric article and at a predetermined curvilinear configuration, comprising sequentially the steps of:
   deforming the mandrel from its preselected curvilinear configuration;
   loading the tubular article in at least a partially uncured state on to the mandrel to form a loaded mandrel;

heating the loaded mandrel up through the transition temperature range of the mandrel which is below the vulcanizing temperature, whereby the mandrel takes on a configuration substantially that of said preselected curvilinear configuration;

vulcanizing the elastomeric article;

cooling the loaded mandrel to below its transition temperature range;

plastically deforming the loaded mandrel to a desired configuration of lesser curvature than the preselected curvilinear configuration; and unloading the curved tubular elastomeric article.

11. The method of claim 10 wherein the transition temperature range has a lower value and an upper value, said lower value being above the softening point of the elastomer so that when the mandrel takes on the configuration substantially that of said preselected curvilinear configuration the uncured elastomer is in a softened state of sufficient plasticity to permit flow under stress.

12. The method of claim 10 wherein the loaded mandrel after the cooling step is plastically deformed to substantially a straightened configuration.

13. The method of claim 10 wherein the steps are repeated for successive production of tubular elastomeric articles at substantially the same shape and curvature.

14. The method of claim 10 wherein prior to said deforming step the mandrel in a basic form is bent into its preselected curvilinear configuration and then heated up to its memory heat treat temperature, and then cooled.

15. A method for producing curved tubular elastomeric articles utilizing a heat recoverable mandrel which has been memory heat treated at a temperature well above the vulcanizing temperature of the elastomeric article and at a preselected curvilinear configuration, comprising sequentially the steps of:

clamping the mandrel in a basic form into a fixture to hold it in its preselected curviliner configuration and then heating the mandrel up to its memory heat treat temperature, cooling it, and removing it from the fixture, and thereafter removing the memory heat treated mandrel from its fixture, cooling the mandrel below its transition temperature range and plastically deforming the mandrel to a shape having lesser curvature than the preselected curvilinear configuration;

loading the tubular article in at least a partially uncured state on to the mandrel to form a loaded mandrel;

heating the loaded mandrel up through the transition temperature range of the mandrel which is below the vulcanizing temperature, whereby the mandrel takes on a configuration substantially that of said preselected curvilinear configuration;

vulcanizing the elastomeric article;

cooling the loaded mandrel to below its transition temperature range;

plastically deforming the loaded mandrel to a desired configuration of lesser curvature than the preselected curvilinear configuration; and unloading the curved tubular elastomeric article.

16. The method of claim 15 wherein the said configuration of lesser curvature than the preselected curvilinear configuration is substantially a straightened configuration.

17. The method of claim 15 wherein the strain associated with the plastic deformation exceeds the strain limit for full recovery of the heat recoverable mandrel, whereby the strain recovery of the mandrel produces a configuration which has lesser curvature than said preselected curvilinear configuration.

* * * * *